(12) United States Patent
Givler (10) Patent No.: US 8,979,981 B1
(45) Date of Patent: Mar. 17, 2015

(54) REUSABLE, MOISTURE WICKING LINER APPARATUS FOR PRODUCE CONTAINERS AND ASSOCIATED METHOD

(71) Applicant: JoAnne L. Givler, Germansville, PA (US)

(72) Inventor: JoAnne L. Givler, Germansville, PA (US)

( * ) Notice: Subject to any disclaimer, the term of this patent is extended or adjusted under 35 U.S.C. 154(b) by 43 days.

(21) Appl. No.: 13/896,981

(22) Filed: May 17, 2013

Related U.S. Application Data

(60) Provisional application No. 61/648,192, filed on May 17, 2012.

(51) Int. Cl.
*B01D 53/02* (2006.01)
*F25D 25/02* (2006.01)
*A23B 7/04* (2006.01)
*B23P 11/00* (2006.01)

(52) U.S. Cl.
CPC ............. *F25D 25/028* (2013.01); *A23B 7/04* (2013.01); *B23P 11/00* (2013.01)
USPC .................. 95/117; 95/116; 62/334; 62/371; 62/407; 62/465; 220/495.01; 220/495.03; 220/495.06; 220/495.07

(58) Field of Classification Search
USPC .............. 62/334, 371, 407, 465; 95/116, 117; 220/495.01, 495.03, 495.06, 495.07
See application file for complete search history.

(56) References Cited

U.S. PATENT DOCUMENTS

| 6,173,580 B1 | 1/2001 | Rosenburg |
| 6,372,220 B1 | 4/2002 | Shukla |
| 7,662,214 B1 | 2/2010 | Wickham et al. |
| 8,101,532 B1 | 1/2012 | Yananton |
| 2002/0182102 A1 | 12/2002 | Fontenot et al. |
| 2009/0314678 A1 * | 12/2009 | Stein .............................. 206/494 |

OTHER PUBLICATIONS

NEAFP (New England Alpaca Fiber Pool Inc.)—Alpaca Garden Fabric (for weed control) http://www.neafp.com/index.php?dispatch=news.view&news_id=2#2.

* cited by examiner

*Primary Examiner* — Christopher P Jones
(74) *Attorney, Agent, or Firm* — Clinton H. Wilkinson; Charles A. Wilkinson (57) ABSTRACT

A liner apparatus and method of extending the shelf like of produce items using said liner apparatus, in which the liner has first and second substantially planar surfaces, and is comprised of a felted body composed of a plurality of alpaca felting fibers and a fiber binding agent, said alpaca felting fibers being felted together with said fiber binding agent to form a felted body that wicks excess moisture from the surface of produce items placed in contact with said felted body.

7 Claims, 5 Drawing Sheets

REUSABLE, MOISTURE WICKING LINER APPARATUS FOR PRODUCE CONTAINERS AND ASSOCIATED METHOD

This application claims the benefit of U.S. Provisional Application No. 61/648,192, filed May 17, 2012, and entitled, "Reusable, Moisture Wicking Liner for Produce Containers and Associated Method," the entire contents of which is hereby incorporated by reference.

FIELD OF THE INVENTION

The present invention relates to materials and products having moisture wicking properties, and more particularly to a moisture wicking liner for containers and refrigerator crisper drawers, and more particularly still to a reusable container and refrigerator crisper drawer lining apparatus and associated method for extending the shelf life of produce food items in which the lining apparatus is comprised substantially of alpaca felting fibers and a binding agent.

BACKGROUND OF THE INVENTION

Perishable foods items, such as meats and produce, are typically stored in refrigerators or freezers to maintain freshness and for preservation. Low refrigeration temperatures help to inhibit the growth and spread of dangerous food-spoiling and pathogenic bacteria, thereby extending the shelf life of perishable food items. Refrigerators are generally recommended to be set at a temperature of around 40° F. or lower for optimal food storing results.

However, while refrigeration helps extend shelf life, the cold environment also causes produce items, i.e., fruits and vegetables, to dry out and become limp unless the humidity inside the refrigerator is kept relatively high. For this reason, most modern refrigerators are equipped with fruit and vegetable compartments, known as crisper drawers, designed to control humidity. Since fruits require a lower humidity than vegetables, a first drawer specifically for fruit and a second drawer specifically for vegetables are included in most moderate to high end refrigerators, while lower end refrigerators have adjustable openings to change the humidity in the drawer depending upon the contents.

Although a relatively humid environment is desirable for refrigerated produce, a moist or wet environment is not. A moist or wet environment will foster bacterial and fungal growth, thereby promoting the food spoiling process. Thus, while a humid environment is beneficial, it is nevertheless desirable both to remove or wipe away any residual moisture on the surface of produce items and to shield produce from contact with wet surfaces.

Several problems are associated with crisper drawers. First, when a produce item is placed in a crisper drawer, a portion of the surface of the stored produce item by necessity is resting on or pressing up against the inner surface walls of the drawer. Prolonged surface contact between the produce and the drawer walls results in trauma to the skin or outermost layers of the produce, which can lead to cellular dissolution. Cellular dissolution can compromise taste, cause unsightly blemishes, and can even accelerate the food spoilage process. Second, free flow of refrigerated air is obstructed from the portions of the produce in contact with nonbreathable surfaces, such as the inner walls of a crisper drawer. Free flow of refrigerated air is necessary in preventing bacterial growth and food spoilage. Third, crisper drawers are often located at the bottom of the refrigerator making the floors of such drawers prone to collecting liquid due to overhumidification or leaks or spills from food or beverage containers above. Collection of liquids along the floors of drawers creates a moist, stagnant environment, promoting bacterial growth, mildew, and food spoilage. Additionally, unnoticed leaked or spilled material will often dry up and solidify leaving stains and malodorous residue that is difficult to remove.

Refrigerator drawer liners for preventing spoilage of produce items are found in the patent literature. Examples of such liners are disclosed in U.S. Pat. Nos. 6,372,220, 7,662, 214, 8,101,532 and U.S. Pat. App. No. 2002/0182102. However, the liners disclosed in these patent references are not reusable indefinitely, thus creating waste upon disposal. Additionally, each of these prior art liners have antibacterial, antifungal or other chemical additives added to the liners, rendering use of such liners potentially unsafe.

U.S. Pat. No. 6,173,580 discloses a plastic or metal refrigerator drawer liner for enhancing refrigerated air flow to produce in the drawer, having a main body that provides a generally upwardly facing produce supporting surface on which produce can be placed. Although this liner can be used indefinitely and does not depend on antibacterial, antifungal or other chemical additives, the plastic or metal construction of the liner will still result in solid surface contact with produce items.

Another problem that exists in the prior art, or with industries in general, is the amount of commercial waste produced each year. The animal fiber harvesting industry is no exception.

Fleece refers the woolen coat of a fiber-bearing animal, before or having been sheared from the animal but prior to being processed into a raw material, such as yarn or thread, typically used in the textile industry.

Interest in alpaca fiber clothing and other textile products has surged in recent years. The alpaca fiber production industry has likewise grown to accommodate this increased demand. Accompanying the increase of alpaca fiber production is the increased quantity of wasted fiber. In the alpaca fleece harvesting industry, an estimated 30-40% of the annually harvested fleece is discarded.

Adult alpacas produce approximately 50-90 oz. of first quality fleece, and 50-100 oz. of second and third quality fleece. To put the amount of waste produced in perspective, an example alpaca yields a total of 145 oz. fleece from its annual harvest. Of the 145 oz. of harvested fleece, approximately 44 to 58 oz. will typically be discarded.

Accordingly, there exists a need for a reusable, chemical-free liner for containers holding produce including refrigerator crisper drawer produce containers, which liner controls humidity, maximizes free flow of refrigerated air to produce stored therein, and shields produce from soiled and wet surfaces. It is also desirable to provide a liner that is economical and is produced with minimal environmental impact. It is further desirable to accomplish the objects above while making use of some material that is largely regarded as waste. The present inventor has unexpectedly discovered that liners comprised primarily of waste and unused alpaca fibers are suitable for such purposes.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF SUMMARY OF THE INVENTION

It is an object of the present invention to provide a safe, reusable container or refrigerator drawer lining apparatus and associated method that inhibits bacterial growth without the use of antibiotics or other added chemical treatments.

It is further an object of the present invention to provide a lining apparatus having a composition that allows for the free flow of air to produce in contact therewith.

It is further an object of the present invention to find a use for uncontaminated alpaca fiber thirds, a material that is widely regarded by the industry as waste.

The invention, in one form thereof, is directed to a reusable lining apparatus for extending the shelf life of produce items comprising a sheet-like felted body having a first substantially planar surface, a second substantially planar surface, and a thickness of at least about one-sixteenth of an inch; said felted body containing a plurality of alpaca felting fibers and a fiber binding agent, said alpaca felting fibers being felted together with said fiber binding agent to form said felted body, whereby when the felted body is inserted in a container suited for holding a plurality of produce items and one or produce items is placed in the container on the felted body, excess moisture that builds up on the one or more produce items is transferred by a wicking process away from the one or more produce items to the felted body.

The invention, in one form thereof, is also directed to method of extending the shelf like of produce items comprising the steps of providing a lining apparatus having a felted body, said felted body having a first substantially planar surface, and a second substantially planar surface; said felted body including a plurality of alpaca felting fibers and a fiber binding agent, said alpaca felting fibers being felted together with said fiber binding agent to form said felted body; providing an existing container having an interior bottom surface; dimensioning the liner body to fit in said container; positioning said liner body along the interior bottom surface of said container; flattening said liner body against the bottom surface of said container as necessary so to maximize surface contact between said liner body and said bottom surface; providing one or more produce items, and placing one or more of said produce items within said container on said liner body, whereby excess moisture formed on the surface of said one or more produce items is wicked away from said produce items to the liner apparatus.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE INVENTION

The present invention will now be described more fully hereinafter with reference to the accompanying drawings, in which one or more embodiments of the invention are shown. This invention may, however, be embodied in many different forms and should not be construed as limited to the embodiments set forth herein. Rather, these embodiments are provided so that this application will be thorough and complete, and will fully convey the true scope of the invention to those skilled in the art.

Preliminary to addressing details of the several embodiments described below, the following terms used in the specification are defined or clarified below.

As used herein, the term "alpaca" refers to any kind, breed, or mixed breed of alpaca, including but not limited to the Huacaya and Suri breeds.

As used herein, the term "alpaca fleece" refers to the fibers harvested from an alpaca. Alpaca fleece is comprised of two types of fibers: primary and secondary fibers. Primary fibers, more typically referred to as "guard hairs", are protective fibers which grow and extend past the inner layer of downy secondary fibers. Guard hairs are generally longer, straighter, and much more robust than secondary fibers. Guard hairs have a large fiber diameter, typically measuring at least 30 microns or greater. Guard hairs are also typically medullated, meaning that the guard hair structure comprises a hollow central core, which may be continuous, interrupted, or fragmented. These characteristics are primarily responsible for the coarse, prickly texture of guard hairs. Secondary fibers are the fibers sought out by the fiber industry, as they are the finer of the two which gives them a much softer texture. Secondary fibers are strong and elastic. Secondary fibers have a naturally crimpy texture as opposed to the straight texture of guard hairs. Crimpiness is typically considered a desirable fiber characteristic by the fiber industry, as crimpier fiber often tends to also be finer and denser, which are likewise desirable characteristics. In terms of fiber structure, secondary fibers are for the most part solid. Secondary fibers have microscopic air pockets located in the center of the fibers with large spacing between cells, providing good thermal insulation as well as making the fibers lightweight.

As used herein, the terms "fleece" and "fibers" refer to alpaca fleece and alpaca fibers, respectively, unless specifically modified to refer to another fiber-bearing animal.

During the shearing process, the harvested fibers are separated into three groups based on quality, namely firsts, seconds, and thirds. As used herein, the term "firsts" refers to highest or first quality fibers, which are sheared from the sides and upper saddle areas of the main body of an alpaca. Blanket fibers, or the fibers from the sides and upper saddle areas, grow relatively evenly and generally include the thickest, longest layer of secondary fibers. Firsts include the softest fleece found on an alpaca, comprising the finest fibers. The soft texture of firsts is due to the small size of the fiber diameter, typically measuring at about 22 microns or less. Additionally, firsts ideally have a length of at least 3 inches or greater to enable such fibers to undergo woolen or worsted processing. In some instances, usually due to improper shearing, after the first cut or shearing, some shorter fibers, typically shorter than one inch, may remain on the sheared alpaca, and a second shearing is required to remove these shorter fibers. The remaining fibers removed during second or subsequent cuts are typically discarded, used for felting, or otherwise not classified with the firsts, as the fibers are too short to be used for woolen or worsted processing. The types of goods created from woolen or worsted alpaca fibers are typically higher-end goods than felted goods, which is one of the reasons the fiber harvesting industry prefers longer fibers, as such longer fibers are capable of woolen or worsted processing.

As used herein, the term "seconds" refers to the medium or second quality fibers, which are typically sheared from the neck, chest, belly and upper legs of an alpaca. The neck, belly, and leg fibers typically do not grow evenly, and may have guard hairs present. Fleece from these areas typically is classified as seconds, provided the presence of guard hairs is relatively low. The guard hairs, if any, are typically removed prior to any type of processing. Seconds are coarser than firsts, having a larger fiber diameter, which typically measures between about 22 microns and about 29 microns. Seconds are most often harvested from the first cut of the neck, belly, and upper leg areas of an alpaca. The remainders, fleece remaining after the first cut which gets sheared off during the second or subsequent cuts, are typically discarded or otherwise not classified with the seconds are they are too short for woolen or worsted processing.

As used herein, the term "thirds" refers to the lowest or third quality fibers. Thirds basically include any fibers that are not firsts or seconds. While from this seemingly broad definition one might surmise that thirds include a medley of fibers having an assortment of characteristics, the fibers that make up thirds can be neatly divided as being one or more of the following three types: robust fibers, short fibers, and contaminated fibers.

As used herein, the term "robust thirds" refers to the coarsest fibers of an alpaca. Fleece comprised primarily or exclusively from these robust thirds normally accounts for the coarsest fleece that can be harvested from an alpaca. Robust third fibers are primarily defined by very large fiber diameters. These fibers have the highest range of fiber diameters, typically measures at about 29 microns or greater.

Guard hairs, or primary fibers, are a subtype of robust thirds. As indicated above, guard hairs characteristically have very large fiber diameters, often measuring over 30 microns or greater. Additionally, guard hairs are typically medullated, which means that the guard hair structure comprises a hollow central core, which may be continuous, interrupted, or fragmented. These characteristics are primarily responsible for the coarse, prickly texture of guard hairs. Guard hairs occasionally grow elsewhere on the alpaca body, including those areas where firsts and seconds are generally harvested, such as the sides and upper saddle areas. In these cases, guard hairs often have a very low presence, often consisting of only a few hairs that have randomly and/or interspersedly grown. These guard hairs are often manually picked and separated from the harvested firsts and seconds and usually discarded.

Secondary fibers can also qualify as robust thirds, provided that such fibers have a fiber diameter within the requisite range. The areas of an alpaca's body where secondary fiber robust thirds are most prevalent often coincide or overlap with the areas where a high presence of guard hairs is typically found. These areas generally include the chest, belly, mid and lower legs of an alpaca. It should also be noted that the chest, belly, mid and lower leg fibers tend to be shorter and grow much less evenly than the blanket fibers. Thus, robust thirds tend to be relatively shorter than their firsts and seconds counterparts.

Thirds also include short fibers, which may include any fibers removed during second or subsequent cuts as may be required. As used herein, the term "second and/or subsequent cut fibers" therefore includes the relatively short fibers sheared off during any required second cut, or subsequent cuts thereafter. The first cut generally refers to the initial round of shearing during the fiber harvesting process, which removes the outer layers of fleece. As indicated above, the first cut sometimes leaves behind a short layer of fleece, comprising short fibers closest to the alpaca's skin which measure about 1 inch or less. Since it is a common practice to completely shear alpacas down to their skin, the remaining fibers are then removed during second or subsequent cuts. Thus, second and/or subsequent cut fibers are characteristically short and typically have a fiber length of about 1 inch or less. Additionally, second and/or subsequent cut fibers can originate from anywhere on the alpaca from which fiber is harvested.

Last, thirds also include contaminated fibers. As used herein, the term "contaminated fibers" refers to fibers which are overly matted or overly contaminated with vegetable or fecal matter. The excessive contamination of these fibers generally makes any attempts to clean such fibers economically impractical. Thus, contaminated fibers typically are discarded, although they sometimes are used as compost or fertilizer.

As used herein, the terms "alpaca felting fibers" or "plurality of alpaca felting fibers" includes robust thirds of any length, any second and/or subsequent cut fibers, as well as firsts and seconds having a fiber length of about 2.25 inches or shorter. Alpaca felting fibers preferably do not include guard hairs, but may since it is difficult to ensure that all guard hairs have been removed. Guard hairs, if present, must not compromise or interfere with the felting process of alpaca felting fibers. Thus, the number of guard hairs present in a plurality of alpaca felting fibers may be limited as necessary. Additionally, alpaca felting fibers comprise a substantially homogeneous mixture of the aforementioned types of fibers included therein.

As used herein, the term "fiber binding agent" refers to a composition of plant, animal, or synthetic fibers, or mixtures thereof, which is capable of felting a plurality of alpaca fibers. The outer surface of the individual fibers comprising a fiber binding agent is covered with microscopic scales which typically point in the same direction. During the felting process, the alpaca fibers and fiber binding agent are rubbed together accompanied by heat, moisture and pressure, causing the scales of the fiber binding agent to lock together with the scales of the alpaca fibers.

As used herein, the term "container" means an object which is capable of holding food and drink items. Examples include, but are not limited to, refrigerators and their shelves, drawers, bins, and other compartments. Examples also include, but are not limited to: kitchenware items, such as fruit bowls, colanders, and food storage containers; dinnerware items, such as plates, bowls, glasses, and cups; and cooking and bakeware items, such as pots, pans, and trays. Containers may also be portable and used for transporting food and drink items. Such containers may also feature insulating properties for the contained items. Examples include, but are not limited to, reusable grocery bags, cooler boxes, bottle carriers and beverage sleeves. Given the moisture wicking properties of the lining apparatus of the present invention as described herein, the liners are especially suited for containers in which spills or leaks of liquids may occur. The liners of the present invention are especially adapted for use in a refrigerator drawers or bins and/or on a refrigerator shelf.

Figure 1:
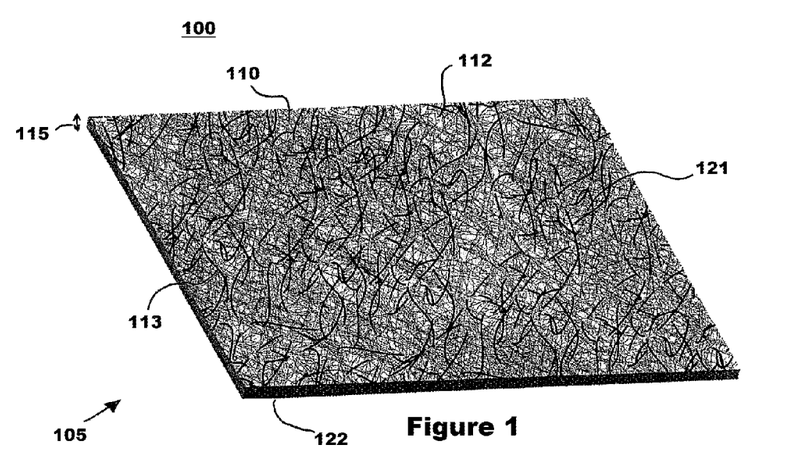
FIG. 1 is a perspective view illustrating a section of a lining apparatus in accordance with an embodiment of the present invention.
Figure 2:
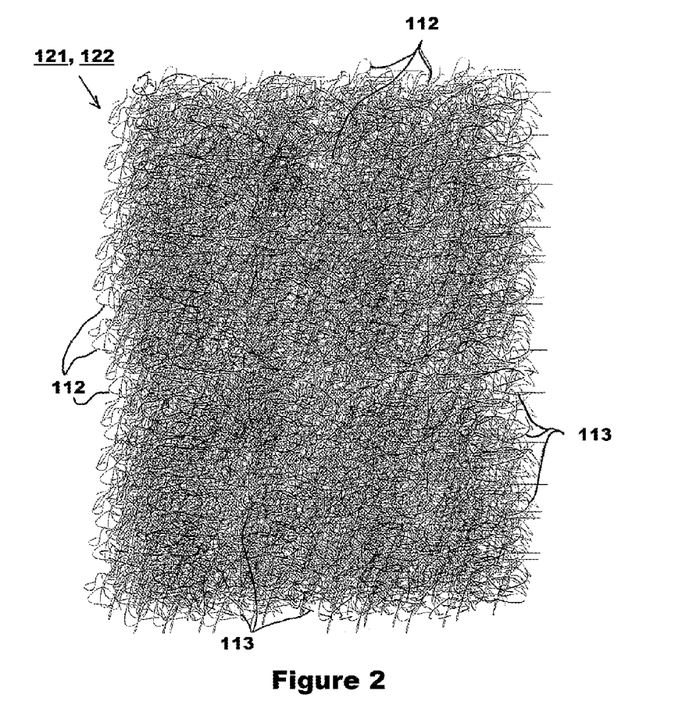
FIG. 2 shows a close-up view of a planar surface of a lining apparatus in accordance with an embodiment of the present invention.

Referring now to the drawings, FIGS. 1-2 illustrate the composition of the lining or liner apparatus of the present invention, and FIGS. 3-6 illustrate preferred manners of use of the liner apparatus, although it should be understood by those skilled in the art that the lining or liner apparatus 100 may be adapted to be used with different types of containers of various shapes and sizes, and thus the liner apparatus 100 is not limited to any specific size or shape or structure. In FIGS. 1-2, a liner section 105 of liner apparatus 100 is shown, which section 105 is qualitatively representative of the liner apparatus 100. More particularly, liner apparatus 100 comprises a felted liner body 110 having a thickness 115 that is preferably substantially uniform throughout the liner body 110. In addition, the liner apparatus 100 has a first surface 121 and a second surface 122, both of which form substantially planar surfaces when the liner body 110 is laid flat.

The liner apparatus 100 comprises a plurality of alpaca felting fibers 112 and a fiber binding agent 113. More particularly, the liner body 110 is formed from a plurality of alpaca felting fibers 112 which have been felted together with the fiber binding agent 113 to form a sheet-like structure.

As should be evident from the above definition of "alpaca felting fibers", the present invention makes use of fibers which are largely regarded by the fiber industry as unusable or waste. The fiber industry typically measures the usability of fibers based on two factors: texture and fiber length. Desirable fibers are generally very soft and smooth, and are long enough to undergo woolen or worsted processing. Undesirable fibers are generally coarse and/or too short for woolen or worsted processing. Thus, the alpaca felting fibers 112 of the present invention can generally be characterized as being too course and/or too short for woolen or worsted processing, and therefore generally classified as waste or unusable fibers, and as defined above include robust thirds of any length, second and/or subsequent cut fibers, as well as firsts and seconds having a fiber length of about 2.25 inches or shorter, as well as a limited number of guard hairs.

Subsequent to experimenting with several textile processing methods, as well as consideration of economic practicality and the need for new products that make use of waste or unusable alpaca felting fibers, the present inventor determined that the felting process provides a dense liner apparatus 100 having the desired moisture wicking capabilities due to concentration of alpaca felting fibers and durability for use as a reusable produce liner in the manner described below. Felting of fibers is a technique whereby in one version the fibers are bonded together by shrinking to produce a dense cloth in a manner that will be understood by those skilled in the art. The preferred felting technique used in manufacture of the liners of the present invention is wet felting or needle felting. Through such experimentation, it was found that the alpaca felting fibers should be present in the liner apparatus 100 in an amount of at least 60% (including 60%) by weight of the whole. In a preferred embodiment, the alpaca felting fibers should be present in the liner apparatus 100 an amount of at least about 60% (including 60%) and about 85% (including 85%) by weight of the whole. In another preferred embodiment, the alpaca felting fibers should be present in the liner apparatus 100 an amount of at least about 70% (including 70%) by weight of the whole.

The alpaca felting fibers 112 used in construction of the liner apparatus 100 are primarily comprised of fibers that heretofore have been largely regarded as waste by the fiber industry for any number of reasons, one of which is because such fibers are too short to undergo woolen or worsted processing; processing techniques which generally produce higher end goods. Even alpaca felting fibers having a small fiber length, although not suitable for worsting, are capable of being felted. While it is known to manufacture felt using alpaca fibers, the felt is only used as a gardening and landscape fabric to prevent growth of weeds or to control erosion, as a hanging pot liner to hold soil in the pot, or the like. As far as the present inventor is aware, no one has conceived of using a felted product as a produce drawer or container liner, where produce or farm-produced goods including fruits and vegetables are carried or stored, to maintain the longevity and freshness of such stored produce items. The inventor, who raises alpacas and makes her own felted products, unexpectedly discovered that produce items placed on a liner comprising a substantial percentage of alpaca felting fibers tended to resist rotting or deterioration longer than produce items resting directly on a hard surface or other known liners. Further experimentation revealed that when a refrigerator drawer is lined with a felted product containing alpaca felting fibers in the indicated percentages, the produce items remained fresh substantially longer than produce items placed directly on the drawer surface, or on paper towels or another liner. It is believed that the alpaca felting fibers in contact with the produce items tend to wick moisture from the surface of the produce items. This is unlike other liner materials such as paper material, which absorbs moisture but does not wick the moisture away from the produce, so that as soon as the paper material become saturated its usefulness is compromised, and the wetness promotes spoilage of the produce items. Alpaca felting fibers, in contrast, have a low moisture absorbency and therefore do not become saturated, but rather wick the moisture away from the produce items, which inhibits food spoilage. In addition, produce items resting on the alpaca felting fiber liner do not tend to dry out more quickly than produce items placed directly in a container, but rather seem to attain an equilibrium state whereby both the rate of spoilage and rate of drying are significantly repressed. Further, the liner apparatus of the present invention allows air to flow between the container surface and surface of the produce items which is resting on the liner, which further prevents damage or initiation of spoilage of the products.

In other embodiments of the invention, the liner apparatus 100 comprises a plurality of liner sections 105 that have been joined together to form a unitary structure. Unlike the embodiments described above, these embodiments involve one or more dimensional and/or shape limitations which are important in order to properly fit the liner sections 105 together in the desired configuration. Additionally, any suitable methods or techniques for joining the liner sections 105 may be used provided that such method or technique securely affixes the sections 105 together. Suitable techniques can include, but are not limited to, sewing, adhesives, and/or fasteners.

In one embodiment, the liner sections 105 can be joined along their edges in a planar fashion. This essentially "quilts" the liner sections 105 together, and allows the liner apparatus 100 to increase in size based on the quantity of liner sections 105 used. In another embodiment, the liner sections 105 can be joined together in a nonplanar fashion along their edges to allow the creation of a structure having a desired depth. For example, five rectangular sections 105 may be joined together, with four of the rectangular sections secured to one of the edges of the fifth rectangular section at a right angle to form an open box-like structure having a compartment. In another embodiment, a plurality of short foot members may be provided in a spaced apart relationship on the lower surface of the liner apparatus, such that the liner apparatus is now raised slightly above the surface of the container surface and in effect one or more pockets may be formed in the liner apparatus between the foot members. Thus, when produce items on placed on the upper surface of the liner apparatus, the weight of the produce item will cause the liner apparatus to be pressed downwardly until the lower surface is in contact with the container surface, and as a result a larger percentage of the surface area of the produce items will be in direct contact with the upper surface of the liner apparatus, which will further effect wicking of moisture from the surface of the produce items into the liner apparatus.

FIG. 2 is a close-up view of a surface 121, 122 of liner apparatus 100 and shows the plurality of alpaca felting fibers 112 and the fiber binding agent 113. The fiber binding agent 113 may be a composition which comprises a plurality of plant, animal, or synthetic fibers, or mixtures thereof, which is capable of felting a plurality of alpaca fibers. In a preferred embodiment, the fiber binding agent 113 consists essentially of a plurality of animal fibers. In another embodiment, fiber binding agent 113 consists essentially of a plurality of sheep fibers. In this embodiment, the only limitation to the sheep fibers is that such fibers must actually have come from sheep. Thus, the sheep fibers of the fiber binding agent 113 may have come from any type, breed, or mixed breed of sheep. Additionally, the plurality of sheep fibers may either be a homogenous or heterogeneous composition, in terms of the sheep type or breed. Thus, the fiber binding agent 113 may comprise fibers from one specific type of sheep, or alternatively, a mixture of fibers from different types of sheep. For the latter case, it is intended that there be no ratio or formula limitations of any kind, in terms of the various types of sheep fibers, for any such heterogeneous compositions. A preferred binding agent is wool.

Figure 3:
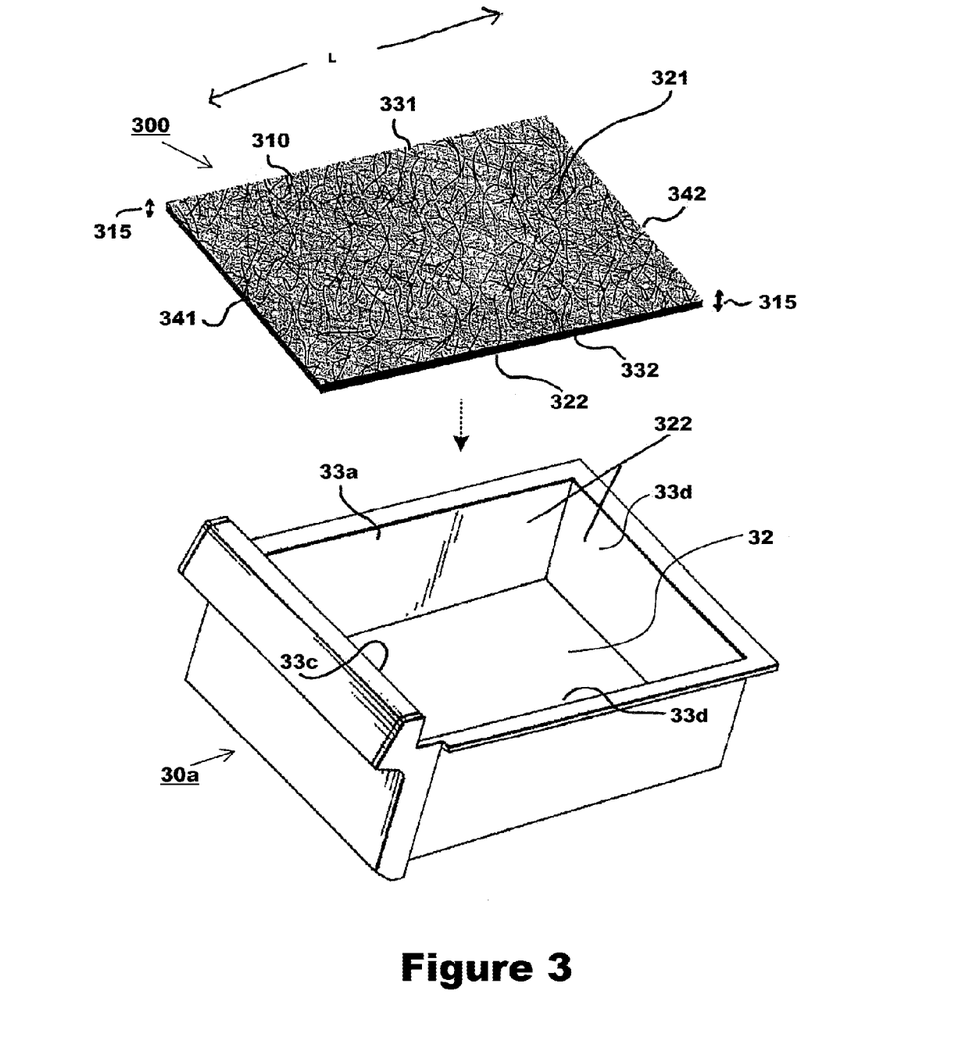
FIG. 3 is a perspective view of a lining apparatus adapted for use with a refrigerator drawer in accordance with an embodiment of the present invention.

FIG. 3 illustrates a preferred embodiment of the lining apparatus of the present invention, in which the lining apparatus has been adapted for use as a liner for an existing refrigerator drawer. Essentially, the primary difference between the liner 300 shown in FIG. 3 and section 105 of liner 100 shown in FIGS. 1-2 is that the liner 300 is specifically sized and dimensioned to be rectangular in shape so as to allow it to fit and be inserted into an existing refrigerator crisper drawer 30.

Rectangular liner 300 comprises a felted body 310 having a thickness 315 that is substantially uniform throughout the liner body 310. The liner 300 has top and bottom surfaces 321, 322 respectively, both of which form substantially planar surfaces when the felted body 310 is laid flat. The perimeter of the rectangular liner 300 is circumscribed by left, right, front, and back longitudinal sides 331, 332, 341, and 342 respectively. The left and right longitudinal sides 331, 332 are equidistantly offset from a central axis passing along an entire longitudinal length of the liner body 310 so that the body 310 evenly touches inner left wall 33a and inner right wall 33b of the existing refrigerator drawer 30. Similarly, the front and back longitudinal sides 341, 342 are equidistantly offset from a central axis passing along an entire longitudinal width of the liner body 310 so that the body 310 evenly touches an inner front wall 33a and inner back wall 33b of the existing refrigerator drawer 30.

The liner body 310 is removably positioned within the existing refrigerator drawer 30 essentially such that the liner body 310 covers the entire inner bottom surface or drawer floor 32 of the existing refrigerator drawer 30. The felted body 310 of rectangular liner 300 should have thickness of at least $1/16^{th}$ inches such that the felted body 300 is strong enough to be reusable, and preferably has a thickness of between at least about $1/8^{th}$ inches and about $1/4$ inches, although different thicknesses may be provided without altering the intended scope and method of use of the present invention. It will be further understood that in one embodiment top and bottom surfaces 321, 322 may be substantially identical and liner 300 can be inserted into drawer 30 with either surface 321 or 322 facing upwardly.

In further embodiments of the invention, the liner 300 may be designed to additionally cover a portion of one or more of the inner side walls 33 of a refrigerator drawer 30. In one embodiment, liner 300 further comprises a second liner 300, in which the first liner 300 is sized to fit and cover an inner bottom wall 32 of the refrigerator drawer and the second liner 300 is sized to fit along a portion of an inner side wall 33 of the refrigerator drawer 30, and the first and second liners 300, 300 are joined together by their adjacent edges. Any suitable methods or techniques for joining the liners 300, 300 may be used, provided that such method or technique securely fixes the sections liners 300, 300 together. Suitable techniques can include, but are not limited to, sewing, adhesives, and/or fasteners. A temporary adhesive could also be provided on the downwardly directed surface of the liner to temporarily secure the sections of liner 300, 300 in the desired adjacent position in drawer 30. In an alternative embodiment, the liner 300 comprises a molded solitary unit, pre-shaped to cover the inner bottom wall 32 and a portion of one or more inner side walls 33 of a refrigerator drawer 30.

Figure 4:
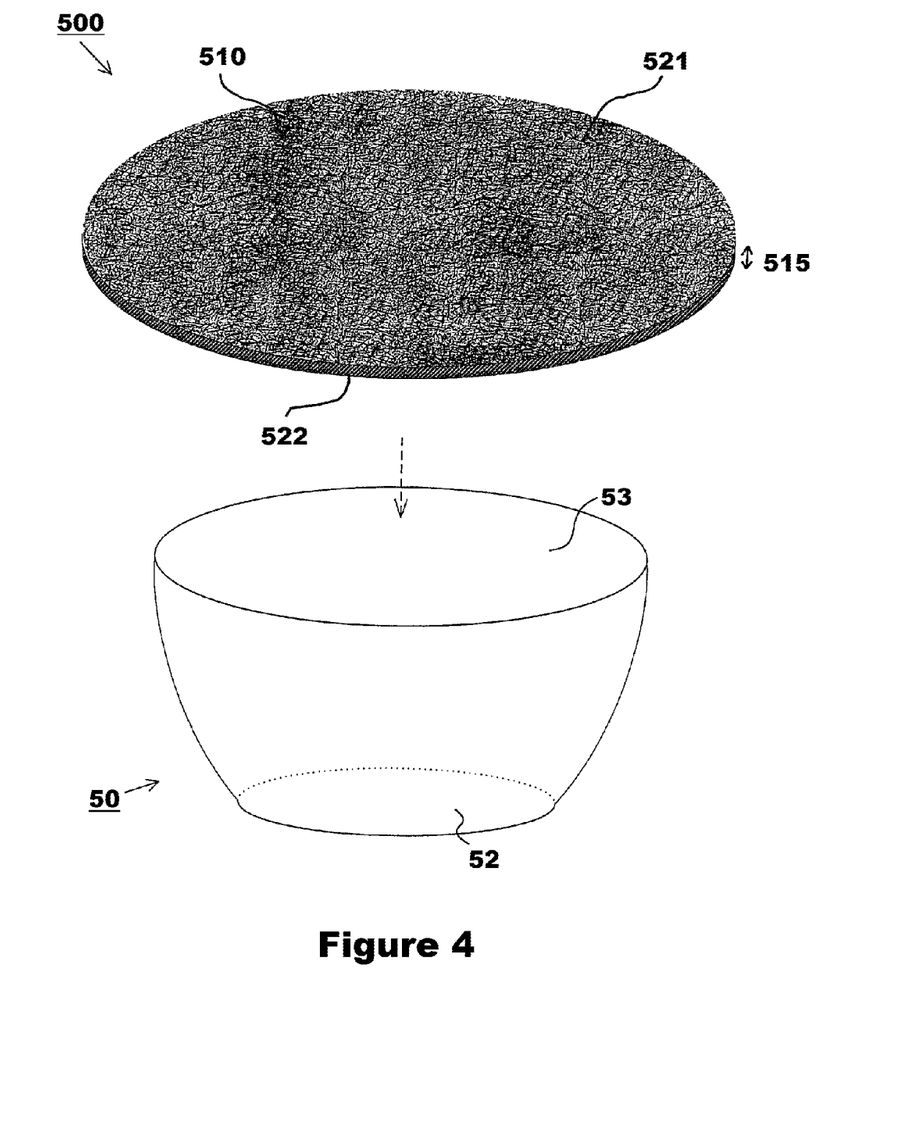
FIG. 4 is a perspective view of a liner apparatus in accordance with another embodiment of the present invention adapted for use with a circular food bowl.

With reference to FIG. 4, an alternative embodiment of the lining apparatus of the present invention is shown, which has been adapted for use with an existing bowl. Essentially, the primary difference between the liner apparatus 500 shown in FIG. 4 and the liner apparatus 100 shown in FIGS. 1-2 is that the liner 500 is specifically oval-shaped so as to allow it to be adapted for use with an existing bowl 30.

The liner apparatus 500 includes a felted liner body 510, which has a thickness 515 that is substantially uniform throughout the liner body 510. The liner apparatus 500 has top and bottom surfaces 521, 522 respectively, both of which form substantially planar surfaces when the felted body 510 is laid flat. The liner body 510 is removably positioned within a rounded bowl 30 such that the liner body 510 covers substantially the entire inner bottom surface 52 of the bowl 50. In a preferred embodiment, the liner body 510 is sized to fit over the bottom surface 52 of the bowl 50 so that the liner body 510 evenly touches the inner side of the supporting walls 53 of the bowl 50.

In another embodiment, the liner body 510 is sizably larger than the inner bottom surface 52 of the bowl 50. With a sizably larger liner body 510, only a portion of the body 510 will be needed to cover the bottom surface 52 of the bowl 50. In particular, when the liner body 510 is placed inside and centered within the bowl 50, the central portion of the body 510 will cover the bottom surface 52 of the bowl 50, leaving an outer edge portion of the body 510 to extend past the bottom surface 52 and align upwards along the inner side of the supporting walls 53 of the bowl. As an example, if the bottom surface 52 of the bowl 50 has a diameter of seven inches, the rim of the bowl has a diameter of ten inches, and the height of the bowl is six inches, liner apparatus 500 may have a circularly shaped liner body 510 with a radius of about ten inches such that when the liner is placed in the bowl it will cover the bottom surface 52 and at least a substantial portion of the supporting walls 53 up to the rim, so that produce items placed in the bowl and normally in direct contact with the bowl will have a portion of their surfaces in direct contact with liner 500. If the produce items are to be stacked on top of each other to fill the container up to the rim, a second smaller circular liner having a radius of ten inches or less can be placed on top of the produce items resting on liner 500 against the bottom surface 52 of the bowl 50, and then additional produce items can be placed on top of the second liner. Thus, in another embodiment, a plurality of liners of the invention can be utilized in combination in order to ensure that all of the produce items are at least partially in contact with the felt liner material of either the first or second liner, or additional liners if necessary, which arrangement would be particularly useful to farmers in storing or carrying their produce to market in bulk storage containers.

Referring again to FIGS. 3 and 4, it should be understood that a square is a specie of the rectangle genus, and a circle is a specie of the oval genus. Thus, unless dimensions are specified and indicate the contrary, or expressly stated otherwise, then a rectangular shape limitation will not preclude squares, and similarly, an oval shape limitation will not preclude circles. Once the produce in container 50 has been used, the liner apparatus 500 can be removed from the container 50 and washed and then dried, at which time it will be immediately ready for reuse.

Figure 5:
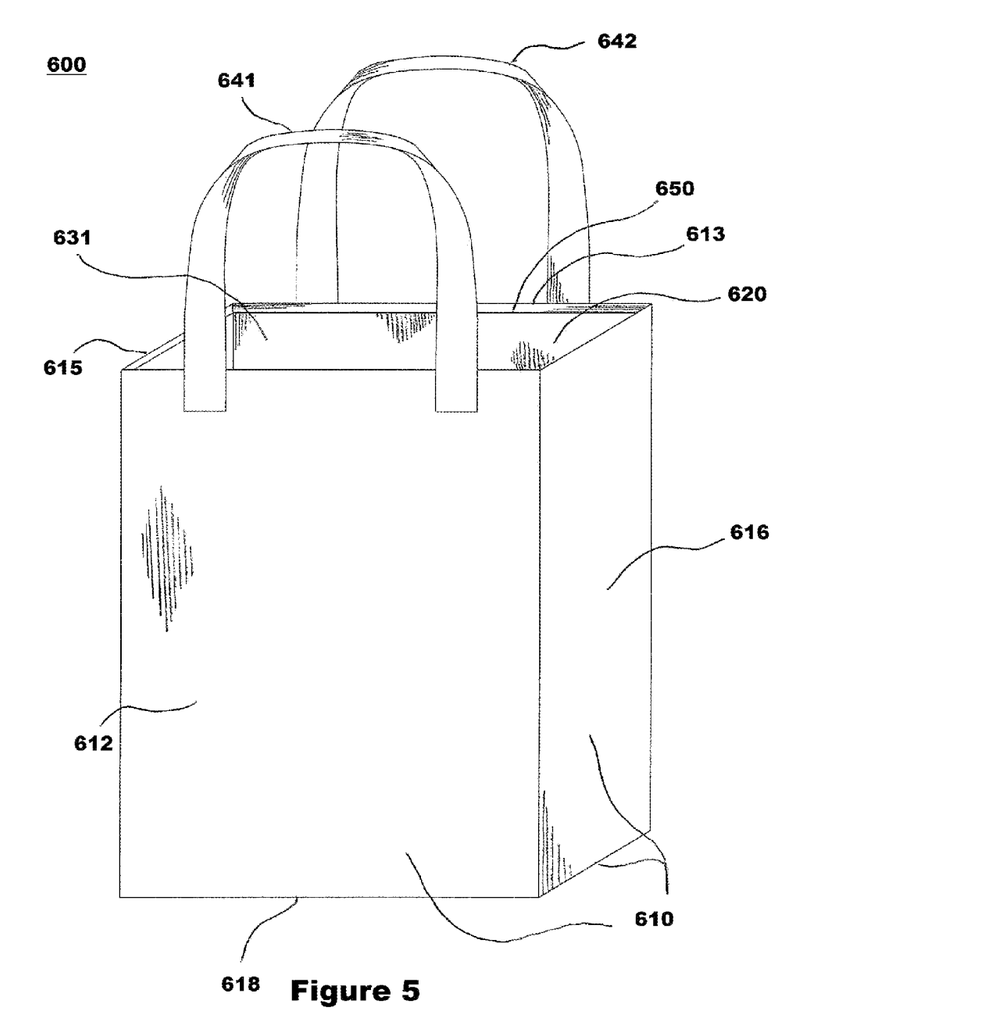
FIG. 5 is a perspective view of a liner apparatus in accordance with another embodiment of the present invention adapted for lining a grocery carrier.
Figure 6:
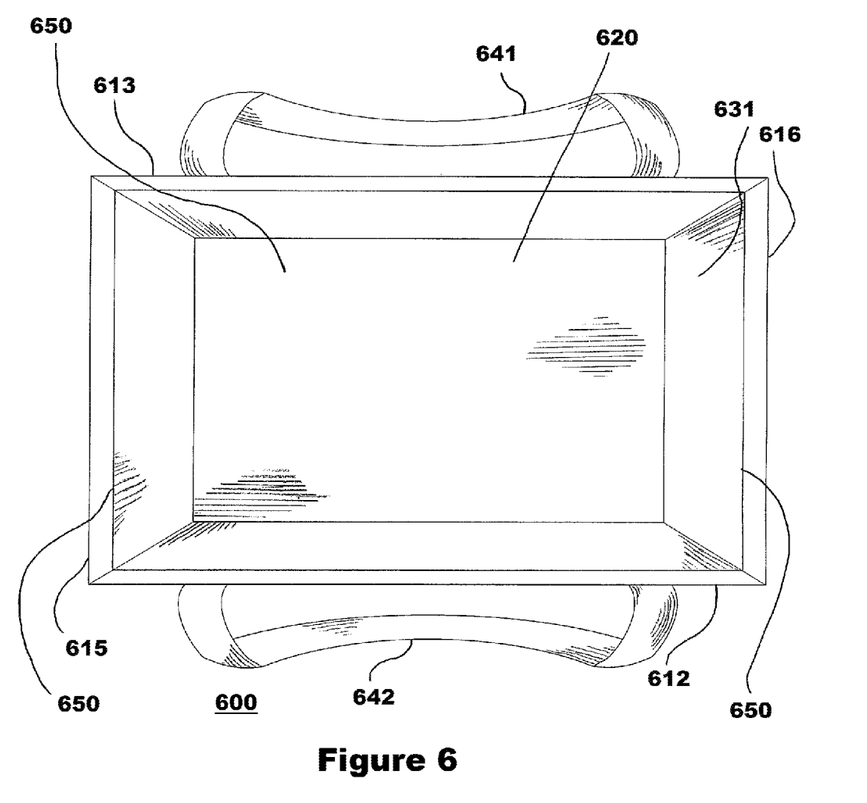
FIG. 6 is a top view of the lined grocery carrier shown in FIG. 5.

FIGS. 5 and 6 illustrate another embodiment of the invention in the form of a lined bag-like carrier 600 for carrying produce as well as other groceries and items as may be desired. Carrier 600 has a plurality of supporting walls 610 which may be rigid or flexible that join together to form a storage compartment 620. Carrier 600 has an internal surface 631 and an external surface 632, and a lining apparatus 650 is attached to and substantially covering a portion of the internal surface 631. The carrier may also include one or more sets of handles 641, 642. In a preferred embodiment, the dimensions of the carrier 600 may be about eight inches wide, about sixteen inches long, and about fifteen inches tall, although it should be understood that the lined carrier 600 is not limited to these dimensions.

In a preferred embodiment, the plurality of supporting walls 610 include opposed side supporting walls 612, 613; opposed end supporting walls 615, 616 joined with the front and back supporting walls 612, 613; and a bottom supporting wall 618 joined with the side and end supporting walls 612, 613, 615, 616, forming a generally rectangular box-shaped storage compartment as shown in FIGS. 5 and 6. However, it should be understood that the number of supporting walls 610, and shape of the storage compartment 620 formed by the supporting walls 610 is not limited by what is shown.

The lining 650 is attached to and covers at least a portion of the internal surface 631 of the carrier. The lining may be sewn into the carrier, although other appropriate methods of attachment may be used. In another embodiment, the lining 650 may only cover the bottom portion of the inner surface 631. In a more preferred embodiment, the lining 650 is sewn into the carrier 600 and covers substantially the entire internal surface 631. In another embodiment, the lining 650 along the bottom wall 618 can be double or triple-layered for added reinforcement. The reinforced liner along the bottom provides additional protection against leakage.

The main difference between the lining 650 shown in FIGS. 5-6 and the lining apparatus 100 shown FIG. 1 is that the lining apparatus 100 is generally defined by a single unit having no shape or dimensional limitations, whereas the lining 650 often comprises multiple units and is limited by the shape and dimensions of the carrier. Although a single unit can be used to line the carrier 600, doing so will often result in an improper or poor fit of the liner within the carrier. Further, unless the lining is confined to a single support wall 610, several units of liners are likely required for optimum fit of the lining 650. Thus, the lining 650 shown in FIGS. 5-6 is essentially a combination of multiple lining apparatuses 100 shown in FIG. 1.

The carrier 600 is intended to be reusable as well as environmentally friendly. To this end, the materials used to construct the carrier 600 should be eco-friendly, strong and sturdy to prevent wear and to optimize the carrier's capacity for use. Sturdiness of material will be particularly important for the bottom supporting wall 618, as well the handles 641, 642. For added reinforcement, the bottom supporting wall 618 may be constructed from multiple layers of material as opposed to a single layer. In a preferred embodiment, the supporting walls 610 and handles 641, 642 can be made from sturdy, eco-friendly textiles, including but not limited to, organic cotton, bamboo fabric, linen, and/or hemp. It will also be understood that the carrier can be modified to carry particular items in addition to grocery and produce items such as being adapted for use as a carrier for wine bottles, or as a tote bag such as a lunch or beverage tote bag, and may have a lined closable lid or top section.

While the present invention has been described at some length and with some particularity with respect to the several described embodiments, it is not intended that it should be limited to any such particulars or embodiments or any particular embodiment, but it is to be construed with reference to the appended claims so as to provide the broadest possible interpretation of such claims in view of the prior art and, therefore, to effectively encompass the intended scope of the invention. As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

What is claimed is:

1. A method of extending the shelf life of produce items comprising the steps of:
   providing a liner apparatus having a felted body, said felted body having a first substantially planar surface, and a second substantially planar surface, and said felted body including a plurality of alpaca felting fibers in an amount of at least 60% (including 60%) by weight of the felted body;
   positioning said liner apparatus along an interior bottom surface of a container;
   flattening said liner apparatus against the bottom surface of the container as necessary so to maximize surface contact between the liner apparatus and said bottom surface; and
   placing one or more produce items within said container on said liner apparatus, whereby excess moisture formed on the surface of said one or more produce items is wicked away from said produce items to the liner apparatus.

2. The method of claim 1 further comprising the additional step of: periodically removing said liner apparatus from said container, washing said liner apparatus, and replacing said liner apparatus in said container.

3. The method of claim 1 in which the container is a refrigerator crisper drawer and the liner apparatus is dimensioned to substantially cover the bottom surface of said crisper drawer.

4. The method of claim 1 in which the container is a bowl and the liner apparatus is dimensioned to substantially cover the inner surface of the bowl.

5. The method of claim 1 in which the container is a flexible bag and the liner apparatus is dimensioned to substantially cover the inner surface of the bag.

6. The method of claim 1 in which the alpaca felting fibers comprise an amount of at least 70% (including 70%) by weight of the felted body.

7. The method of claim 1 in which the felted body additionally comprises an amount of wool equal to at least 20% (including 20%) of the weight of the felted body.

* * * * *